United States Patent [19]
Håkansson
[11] 3,907,880
[45] Sept. 23, 1975

[54] PROCESS FOR THE PREPARATION OF 3-ACETAMIDO-5-AMINOBENZOIC ACID

[75] Inventor: Christer Lennart Håkansson, Karlskoga, Sweden

[73] Assignee: AB Bofors, Bofors, Sweden

[22] Filed: Mar. 14, 1973

[21] Appl. No.: 341,224

[52] U.S. Cl. .............................................. 260/518 R
[51] Int. Cl.[2] ......................................... C07C 103/30
[58] Field of Search ................................ 260/518 R

[56] References Cited
OTHER PUBLICATIONS

Finak, I. L., Organic Chemistry, Vol. I, (1963), Pub. by Richard Clay & Co., Great Britian, p. 202 relied on.

*Primary Examiner*—Anton H. Sutto
*Assistant Examiner*—L. A. Thaxton
*Attorney, Agent, or Firm*—Pollock, Philpitt & Vande Sande

[57] ABSTRACT 3-acetamido-5-aminobenzoic acid is a valuable intermediate for the preparation of drugs especially for certain types of iodine compounds which are used as X-ray contrast agents. According to the present invention it is prepared by acetylating of 3,5-diaminobenzoic acid in an aqueous solution in the presence of a mineral acid. The 3-acetamido-5-aminobenzoic acid is then obtained in the form of its salt of the mineral acid from which salt the desired free acid may be recovered by adding a base. The free acid is obtained in high yields and of high purity.

11 Claims, No Drawings

PROCESS FOR THE PREPARATION OF 3-ACETAMIDO-5-AMINOBENZOIC ACID

BACKGROUND

The present invention relates to a process for the preparation of 3-acetamido-5-aminobenzoic acid. 3-acetamido-5-aminobenzoic acid is a valuable intermediate for the preparation of drugs, especially for certain types of iodine compounds which are used as X-ray contrast agents.

According to the processes previously known 3-acetamido-5-aminobenzoic acid is usually prepared from 3,5-dinitrobenzoic acid in a synthesis that starts with a partial reduction to 3-amino-5-nitrobenzoic acid by means of special reduction agents. After acetylation to 3-acetamido-5-nitrobenzoic acid the desired product is prepared by a repeated reduction with a suitable reduction agent.

From an economical point of view it should have been more advantageous to reduce 3,5-dinitrobenzoic acid directly to 3,5-diaminobenzoic acid and thereafter prepare the desired monoacetyl derivative, 3-acetamido-5-aminobenzoic acid, by an acetylation according to the following reaction formulae:

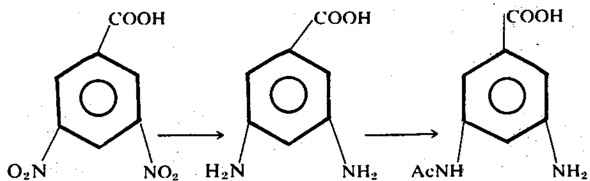

The experiments to make such a partial acetylation have, however, hitherto given mixtures where the desired monoacetyl compound is present together with considerable amounts of diacetyl compound and/or unreacted diaminobenzoic acid. It is not possible in an economical way to recover the desired monoacetyl compound of acceptable purity from such mixtures.

THE PRESENT INVENTION

The novel process according to the present invention has now made it possible selectively to carry out the desired monoacetylation of the 3,5-diaminobenzoic acid so that 3-acetamido-5-aminobenzoic acid may be obtained in high yields and of high purity.

The process according to the invention is substantially characterized by acetylating of 3,5-diaminobenzoic acid in an aqueous solution in the presence of a mineral acid, whereby 3-acetamido-5-aminobenzoic acid gradually precipitates in the form of its mineral acid salt, from which the desired free acid then may be recovered by adding a base.

The starting material, 3,5-diaminobenzoic acid, is dissolved in an excess of water by means of a suitable mineral acid. The mineral acid is added in an amount of at least 1 mol per mol of 3,5-diaminobenzoic acid. The solution is cooled to a temperature that gives a low solubility of the mineral acid salt of 3-acetamido-5-aminobenzoic acid, e.g. 0°–20°C. If necessary, also a soluble salt, e.g. the sodium salt, of the mineral acid is added in a suitable amount so as to reduce this solubility still more. In order to ensure a rapid precipitation the solution may be inoculated with a pre-prepared salt of 3-acetamido-5-aminobenzoic acid with the mineral acid used. Acetic anhydride is thereafter slowly added under good stirring and necessary cooling in an amount of at least 1 mol per mol of diaminobenzoic acid. in order to compensate for losses of acetic anhydride by hydrolysis, the anhydride is used in a suitable excess. The reaction occurs easily and as the anhydride is supplied drop by drop a bigger and bigger quantity of crystalline mineral acid salt of 3-acetamido-5-aminobenzoic acid precipitates. After all the anhydride has been added the stirring is continued at the same temperature during a suitable time to make the reaction finish.

The free 3-acetamido-5-aminobenzoic acid is recovered from the precipitated mineral acid salt by a pH-adjustment to the isoelectric point of the product, i.e., about 3.8. This may occur directly in the reaction mixture or else the mineral acid salt may at first be filtered off and suspended or dissolved in water.

Hydrochloric acid and nitric acid may be mentioned as examples on suitable mineral acids.

The invention will be further described in the following working Examples which however do not limit the scope of invention.

EXAMPLE 1

A solution consisting of:

15.2 g. of 3,5-diaminobenzoic acid = 0.1 mol
20.0 g. of concentrated hydrochloric acid = 0.2 mol
5.8 g. of sodium chloride = 0.1 mol
and 100 g. of water was inoculated at 12°C with about 1–2 mg. of finely crystalline hydrochloride of 3-acetamido-5-aminobenzoic acid. 10.2 g. of acetic anhydride = 0.1 mol was added drop by drop under stirring at about 12°C during 45 minutes. A crystalline precipitation was gradually formed. The stirring continued for another 20 minutes, whereupon the precipitation was filtered off. It was suspended in 10 ml. of water and a 25% solution of NaOH was added under stirring until a stable pH of about 3.5–4 was obtained. The 3-acetamido-5-aminobenzoic acid obtained was filtered off, washed with water and dried overnight at 50°C. The obtained, dried and almost colourless product weighed 13.6 grammes, which corresponds to a yield of 64% of a product with one mole of crystal water The product was analysed by means of thin layer chromatography (TLC) and was found to be practically free from diaminobenzoic acid. Diacetyl compound could be proved in an amount of about 0.5%. Otherwise the product was free from impurities. The melting point was 220°–221°C after the crystal water had been evaporated.

EXAMPLE 2

The experiment in Example 1 was repeated but with the difference that the amount of acetic anhydride was increased to 13.2 g. = 0.13 mols i.e. an excess of 30% in relation to the diaminobenzoic acid as charged. 16.7 g. of 3-acetamido-5-aminobenzoic acid was recovered, which corresponds to a yield of 78% of a product containing crystal water. The product was free from diaminobenzoic acid according to TLC-analysis and contained about 0.5% of diacetyl compound. The melting point was 220°–221°C after the crystal water had been evaporated.

EXAMPLE 3

The experiment of Example 1 was repeated but with the difference that the amount of acetic anhydride was increased to 17.4 g. =0.17 mols, i.e., an excess of 70%. After the addition of the acetic anhydride during 70 minutes at 12°C the reaction was continued at the same temperature during 60 minutes. The precipitated hydrochloride of the acetyl compound was suspended in 200 ml. of water after filtering off and was heated to about 75°C and a clear solution was obtained. Diluted ammonia was added drop by drop to a pH of 3.8 and a crystalline precipitation was formed. The substance was filtered off after cooling to 10°C and was washed with water. After drying in vacuo 16.8 g. of water-free product was obtained, i.e., a yield of 87%. The melting point was 220°–221°C and the content of diacetyl compound was about 0.5% according to TLC-analysis.

It is clear from the Examples 1–3 that the yield may be increased by the use of a suitable excess of acetic anhydride without increasing the formation of diacetyl compound.

EXAMPLE 4

The experiment of Example 3 was repeated but instead of filtering off the precipitated hydrochloride water was added to the reaction mixture which was then heated to 75°C. Ammonia was added to a pH of 3.8 and a crystalline precipitation was formed upon cooling. After filtering off, washing and drying 15 grammes of a water-free product was obtained, which corresponds to a yield of 77.5%. The melting point was 219°–221°C and the content of diacetyl compound was 1%.

EXAMPLE 5

A solution consisting of:
15.2 g. of 3,5-diaminobenzoic acid = 0.1 mol
20 g. of 65% nitric acid = 0.2 mol
and 100 ml. of water
was prepared at 60°C and was cooled to 12°C, by which a precipitation was formed. 15.3 g. of acetic anhydride = 0.15 mol was supplied drop by drop under stirring at 12°C during 60 minutes. The stirring was continued at 12°C for another 3 hours. The precipitation was filtered off and was dissolved at 75°–80°C in 200 ml. of water. Ammonia was added to a pH of 3.8 and a crystalline precipitation was formed. After cooling to 10°C the product was filtered off and was washed with water. After drying in vacuo 15.7 g. of water-free 3-acetamido-5-aminobenzoic acid was obtained which corresponds to a yield of 81%. The melting point was 215°–217°C and the content of diacetyl compound was 1.5–2%.

EXAMPLE 6

A solution consisting of:
15.2 g. of 3,5-diaminobenzoic acid = 0.1 mol
10 g. of concentrated hydrochloric acid = 0.1 mol
17.4 g. of sodium chloride = 0.3 mol
and 100 g. of water
was inoculated at 12°C with about 1-2 mg of finely crystalline hydrochloride of 3-acetamido-5-aminobenzoic acid. 15.3 g. of acetic anhydride (=0.15 mol) was slowly supplied drop by drop under stirring at about 12°C during 60 minutes. The stirring was continued at 12°C for another 3 hours. The precipitation obtained was filtered off and was then suspended in 200 ml. of $H_2O$. After that it was heated to about 80°C and a practically clear solution was obtained. Ammonia was added drop by drop to this solution to a pH of 3.8 and a crystalline precipitation was formed. After cooling to 10°C the precipitation was filtered off and was washed with 2 × 25 ml. of water. After drying in vacuo 16.0 g. (a yield of 82.5%) of a water-free product was obtained which product had a melting point of 217°–219°C. The product was free from diaminobenzoic acid according to a thin layer chromatography analysis and the content of diacetyl compound was about 2%.

I claim:

1. A process for the preparation of 3-acetamido-5-aminobenzoic acid consisting essentially of:

A. acetylating 3,5-diaminobenzoic acid with acetic anhydride in an aqueous solution in the presence of a mineral acid whereby 3-acetamido-5-aminobenzoic acid gradually precipitates in the form of its mineral acid salt; and B. recovering the desired free acid by adding a base.

2. The process of claim 1 wherein the mineral acid is hydrochloric acid or nitric acid.

3. The process of claim 2 wherein the acetylation is carried out with acetic anhydride in an amount of at least one mole per mole of 3,5-diaminobenzoic acid as charged.

4. The process of claim 2 wherein the acetic anhydride is added slowly during a period of 0.5–1 hour or longer.

5. The process of claim 4 wherein an easily soluble salt of the mineral acid is added so as to further reduce the solubility of the mineral acid salt of the desired acid.

6. The process of claim 3 wherein the mineral acid is hydrochloric acid or nitric acid.

7. The process of claim 1 wherein the acetylation is carried out with acetic anhydride in an amount of at least one mole per mole of 3,5-diaminobenzoic acid as charged.

8. The process of claim 7 wherein the acetic anhydride is added slowly during a period of 0.5–1 hour or longer.

9. The process of claim 1 wherein an easily soluble salt of the mineral acid is added so as to further reduce the solubility of the mineral acid salt of the desired acid.

10. The process of claim 1 wherein the solution is inoculated with a preprepared salt of 3-acetamido-5-aminobenzoic acid with the mineral acid employed.

11. The process of claim 1 wherein the mineral acid is added in an amount of at least 1 mole per mole of 3,5-diaminobenzoic acid.

* * * * *